United States Patent [19]
Sweeny

[11] Patent Number: 6,055,909
[45] Date of Patent: May 2, 2000

[54] ELECTRONICALLY CONFIGURABLE TOWED DECOY FOR DISPENSING INFRARED EMITTING FLARES

[75] Inventor: L. Ray Sweeny, Solvang, Calif.

[73] Assignee: Raytheon Company, Lexington, Mass.

[21] Appl. No.: 09/162,104

[22] Filed: Sep. 28, 1998

[51] Int. Cl.[7] .................................. F42B 4/26; F42B 4/10
[52] U.S. Cl. ..................... 102/336; 89/1.54; 244/1 TD; 102/351
[58] Field of Search ................................ 102/334, 336, 102/351, 357; 89/1.1, 1.11; 244/1 TD

[56] References Cited

U.S. PATENT DOCUMENTS

| | | | |
|---|---|---|---|
| 3,362,289 | 1/1968 | Guin | 89/1.1 |
| 4,697,521 | 10/1987 | Espagnacq et al. | 89/1.11 |
| 4,765,244 | 8/1988 | Spector et al. | 89/1.11 X |
| 4,852,455 | 8/1989 | Brum | 244/1 TD X |
| 5,074,216 | 12/1991 | Dunne et al. | 102/334 |
| 5,333,814 | 8/1994 | Wallis | 244/1 TD |
| 5,400,712 | 3/1995 | Herbage et al. | 102/336 X |
| 5,495,787 | 3/1996 | Boyer, III | 89/1.11 |
| 5,497,156 | 3/1996 | Bushman | 244/1 TD |
| 5,585,594 | 12/1996 | Pelham et al. | 102/336 |
| 5,603,470 | 2/1997 | Fitzgerald et al. | 244/1 TD |
| 5,679,921 | 10/1997 | Hahn et al. | 102/336 X |
| 5,852,254 | 12/1998 | Wardecki | 102/336 X |
| 5,915,694 | 6/1999 | Brum | 273/359 |

*Primary Examiner*—Charles T. Jordan
*Assistant Examiner*—Denise J Buckley
*Attorney, Agent, or Firm*—William C. Schubert; Glenn H. Lenzen, Jr.

[57] ABSTRACT

This invention proposes to make use of an already developed set of hardware which dispenses and controls the performance of towed decoys capable of defeating radar guided weapons. Using this same hardware, a new and unique payload, payload control and dispensing mechanism is inserted into a decoy towbody. The payload consists of foils and/or foil packs of a pyrophoric material. This material creates an infrared (IR) signature behind the decoy that is more attractive than the infrared plume emitted by the aircraft engine. The fact that the IR decoy is towed insures that it will be kinematically correct by flying the same profile as the aircraft so as to remain within the field of view of the missile's seeker. Because the pyrophoric material can be metered (dispensed at varying and controllable rates) its radiant intensity can be matched with that of the engine of the towing aircraft. As the burn characteristics of the selected pyrophoric material match the burn profile of hydrocarbon based jet fuels, the towed IR decoy also emits a plume that spectrally matches that of its host aircraft's engine.

34 Claims, 3 Drawing Sheets

ELECTRONICALLY CONFIGURABLE TOWED DECOY FOR DISPENSING INFRARED EMITTING FLARES

BACKGROUND OF THE INVENTION

1. Technical Field

This invention relates to a infrared (IR) flare dispensing towed decoy, and more particularly, to such an IR flare dispensing towed decoy that is electronically configurable to vary its IR emissions and burn duration.

2. Background Art

Infrared-guided and radar-guided missiles pose the primary threats to military aircraft engaged in a combat environment. These missiles use their radar and IR guidance to home in on aircraft, thereby substantially increasing their probability of a "hit".

One method of defeating radar-guided missile attacks is to tow a decoy behind the host aircraft that is a more attractive radar target than the aircraft itself, so that the attacking missile chooses the towed decoy as opposed to the aircraft. The assignee hereto has pioneered this particular technology, developing a system for countering radar-guided weapons which is currently entering production for Air Force and Navy combat aircraft under the nomenclature of AN/ALE-50. However, to date no similar capability for defeating non-imaging IR-guided missiles has been developed.

Current military aircraft are particularly vulnerable to attack from IR-guided surface-to-air and air-to-air missiles. Statistics gathered from analysis of aircraft losses in hostile actions since 1980 show that almost 90% of these losses have been the result of IR-guided missile attacks. Thus, IR-guided missiles have become a formidable threat to military aircraft. These missiles can either be guided to their target entirely using IR-guidance or can initially utilize radar guidance and then switch over to IR guidance as they come into closer proximity to the target. In regards to the latter approach, IR-guided missiles can be cued via radar, or a passive Infrared Search and Track (IRST) system employed with the missiles can be alerted and properly oriented via a data link from a ground based surveillance or early warning radar. Optimally, however, IR-guided missiles are launched at an aircraft without the use of radar cueing, which often alerts an aircrew to an impending missile attack when the radar signals are detected by an on-board radar warning receiver. These IR-guidance only missiles are essentially passive and can be launched as a result of visual observation of the approaching aircraft, via self cueing or with assistance from a IRST system. In the absence of warning to the target aircraft, these missiles have a high degree of lethality.

The number and variety of infrared guided missiles pose a significant challenge to the development of an effective countermeasure in that the missiles tend to employ a wide variety of IR counter-countermeasure (IRCCM) capabilities. This makes it difficult to devise techniques that will be effective across the spectrum of IR guided missile threats and insensitive to the presence/absence or type of IRCCM being employed.

A number of methods have been used in an attempt to reduce the lethality of IR-guided missiles. Aggressive maneuvering of the target aircraft is often attempted if there is sufficient warning of an approaching missile. Also, pyrotechnic or pyrophoric flares that are forcibly ejected from on-board magazines using pyrotechnic squibs as the motive source have been employed. However, these devices burn at the necessary intensity for only a short period of time. In addition, gravity quickly separates the flares from the dispensing aircraft removing them from the missile seeker's field of view—thus limiting or reducing their effectiveness. These IR flares can also be identified by some missiles and rejected because they tend to initially provide more intense IR emissions than the aircraft. Furthermore, some missiles can also identify IR emitting flares by their IR spectrum.

Another current countermeasure involves the use of an IR jammer. Infrared jammers attempt to confuse missile seekers by "blinking" IR energy at an approaching missile. This energy is modulated at rates designed to confuse the signal processing circuitry of the attacking missile and induce sufficient angle error in its guidance mechanism so as to cause a miss. However, IR jammers have not been particularly successful for a number of reasons. The lamp sources of IR energy have difficulty generating sufficient intensity to overcome the aircraft engine's IR signature. They normally are required to be omni-directional since the direction of missile attack is not generally known. This further dilutes their energy density. If they are focused into a controlled beam to increase their energy on the IR missile seeker, they require fairly accurate pointing information which is not currently available on fighter aircraft. Finally, since different types of IR-guided missiles rarely use the same signal processing technology, it has not been possible to create a generic jamming modulation effective against all missiles. This can only be accomplished if the jammer designer has intimate knowledge of the missile seeker which allows him/her to exploit its design vulnerabilities. Clearly, this requires knowledge gained via exploitation of captured or covertly obtained missiles or through other intelligence sources. However, this is an impractical approach given the number and variety of IR-guided missile types.

In conclusion, the aforementioned approaches have proven to be individually and collectively inadequate to assure the survivability of military aircraft threatened by IR guided missiles. Therefore, what is needed is a system for distracting IR missiles from a target aircraft that tracks with the movement of the aircraft and provides the same IR spectral characteristics as the aircraft to be protected. Furthermore, this system should be able to control its radiant intensity so as to attract IR-guided missiles which are able to more closely discriminate between aircraft IR signatures and IR decoy launched flares. Additionally, the system should exhibit a sufficient burn duration to provide protection over a reasonable length of time against a possible missile attack.

SUMMARY

These needs are fulfilled by a towed IR decoy that flies the same profile as the aircraft it is protecting, such that the decoy remains in the IR-guided missile's field of view unlike current aircraft deployed flares which quickly fall away from the aircraft. This decoy also exhibits the same IR spectral characteristics such that the attacking missile cannot discriminate between the decoy and the aircraft to be protected on the basis of these characteristics. Furthermore, this decoy is able to vary its radiant intensity so as to provide an irresistible distraction to the incoming missile. Finally, the decoy is long-lived so that it provides protection against a possible missile attack over an appropriate period of time. This allows the towed IR decoy to be used preemptively (i.e., without need of warning of missile attack) at the option of the aircrew whenever they are likely to be immediately vulnerable to IR missile attack.

Generally, the towed decoy of the present invention creates an irresistible distraction which is effective against all of the current generation of attacking IR-guided missile, regardless of the IR counter-countermeasures (IRCCM) employed by the attacking missile. Specifically, the decoy is designed to eliminate, or render ineffective, the key discriminants used by most current generation, non-imaging, IR-guided missiles as IRCCMs. This invention proposes to make use of an already developed set of hardware which dispenses and controls the performance of towed decoys capable of defeating radar-guided weapons (i.e. the AN/ALE-50 system). Using this deployment hardware, a new and unique payload, payload control and dispensing mechanism is inserted into a decoy towbody. The payload consists of foils and/or foil packs (containing multiple foils or packets of powders) of pyrophoric material. Suitable pyrophoric foil flare materials are described in U.S. Pat. No. 5,464,699. This material will create an infrared signature behind the decoy that is more attractive than the infrared plume emitted by the aircraft engine or distracts the missile enough to cause it to miss its intended target. The fact that the IR decoy is towed insures that it will be kinematically correct (flying the same profile as the aircraft and within the field of view of the missile seeker), and because the pyrophoric material will be metered (dispensed at varying and controllable rates) its radiant intensity can be matched with that of the engine of the towing aircraft. In addition, the burn characteristics of the selected pyrophoric material match the burn profile of hydrocarbon based jet fuels. Thus, the towed IR decoy also emits a plume that spectrally matches that of its host aircraft's engine. The decoy's ability to meter its payload and it relatively large flare capacity combine to provide a long life that effectively defeats any temporal discriminants used by current IR-guided missiles.

One embodiment of a decoy according to the present invention includes a cylindrical housing. This housing is made up of two independent sections which are joined together in the area where a towline is attached. The forward section contains electronics and a motor which act as a motive source for the payload dispensing mechanism. The aft section contains the payload dispensing mechanism and the pyrophoric material payload in hermetically sealed packages. Mounted at the aft end of the aft section are stabilizing fins.

By separating the decoy housing into two primary sections, it is possible to adopt a manufacturing approach which gives cognizance to the fact that the payload section contains a hazardous material which is subject to the special handling and treatment requirements normally accorded fuels or munitions. The two sections can be built and tested independently, then joined prior to being encapsulated for extended storage. The forward section encompasses a structure for mounting a number of circuit cards, a towline attachment mechanism, and a structure for mounting an electric stepper motor. It also contains a ballast which assures aerodynamic stability via controlling the decoy center-of-gravity/center-of-pressure. This ballast also provides structural rigidity and attachment points for securing the aft (payload) section.

Power is delivered down a towline via appropriate electrical cabling to the decoy from a power supply contained in the on-aircraft launch controller. This power is conditioned in the circuit card area to provide three discrete voltages necessary to operate the decoy. The circuit cards perform communication, motor control and power conditioning functions. More particularly, a modem provides a communication interface between the aircraft and the decoy. This two-way communication involves commands from the aircraft to the decoy for controlling payload dispensing initiation/stop and dispensing rates for the pyrophoric material, and from the decoy to the aircraft for relaying decoy health and status. A motor provides the motive force for the payload dispensing mechanism. This motor is releasably connected to a screw shaft in the aft section of the decoy via a "blind-mating" connector. A motor controller circuit board establishes the parameters of motor operation (e.g. rotation speed) and provides commands directly to the motor. Power conditioning is provided by the power conditioning circuitry which provides appropriate voltages to the motor, motor controller and modem.

The aft (payload) section is comprised of a non-rotating piston riding on the aforementioned screw shaft. The screw shaft runs the length of the payload section terminating at a spin-off end cap which seals the payload in the decoy prior to deployment. The payload consists of approximately 6,000–7,000 disks/foils of pyrophoric material which are mounted with a preload on the screw shaft. The preload allows the payload to act as a solid object instead of a compressible object, thus affording accurate metering of the material. In addition, the preload causes each foil to "spring" out of the back of the payload section, thereby facilitating the dispensing of the material. Upon command, the electric motor turns the screw shaft causing the end cap to spin-off and the piston to ride down the screw shaft pushing the pyrophoric foils ahead of it. The rate at which the motor turns determines the rate at which the foils are dispensed into the atmosphere, and in turn, the intensity of the IR signature. The more units of material dispensed per unit time, the higher the radiant intensity generated. The dispensing rates (and so motor speed) are calculated to generate the IR signature necessary to cause an attacking IR missile to miss the host aircraft. The motor speed requirements are programmed into the memory of the on-aircraft launch controller and in turn transmitted to the motor controller of decoy. This controllability allows the decoy to defeat IRCCM intensity discriminants and also provides suitable burn duration to permit preemptive usage.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims and accompanying drawings where:

DETAILED DESCRIPTION OF THE PREFERRED EMBODIMENTS

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Figures 1A, 1B:
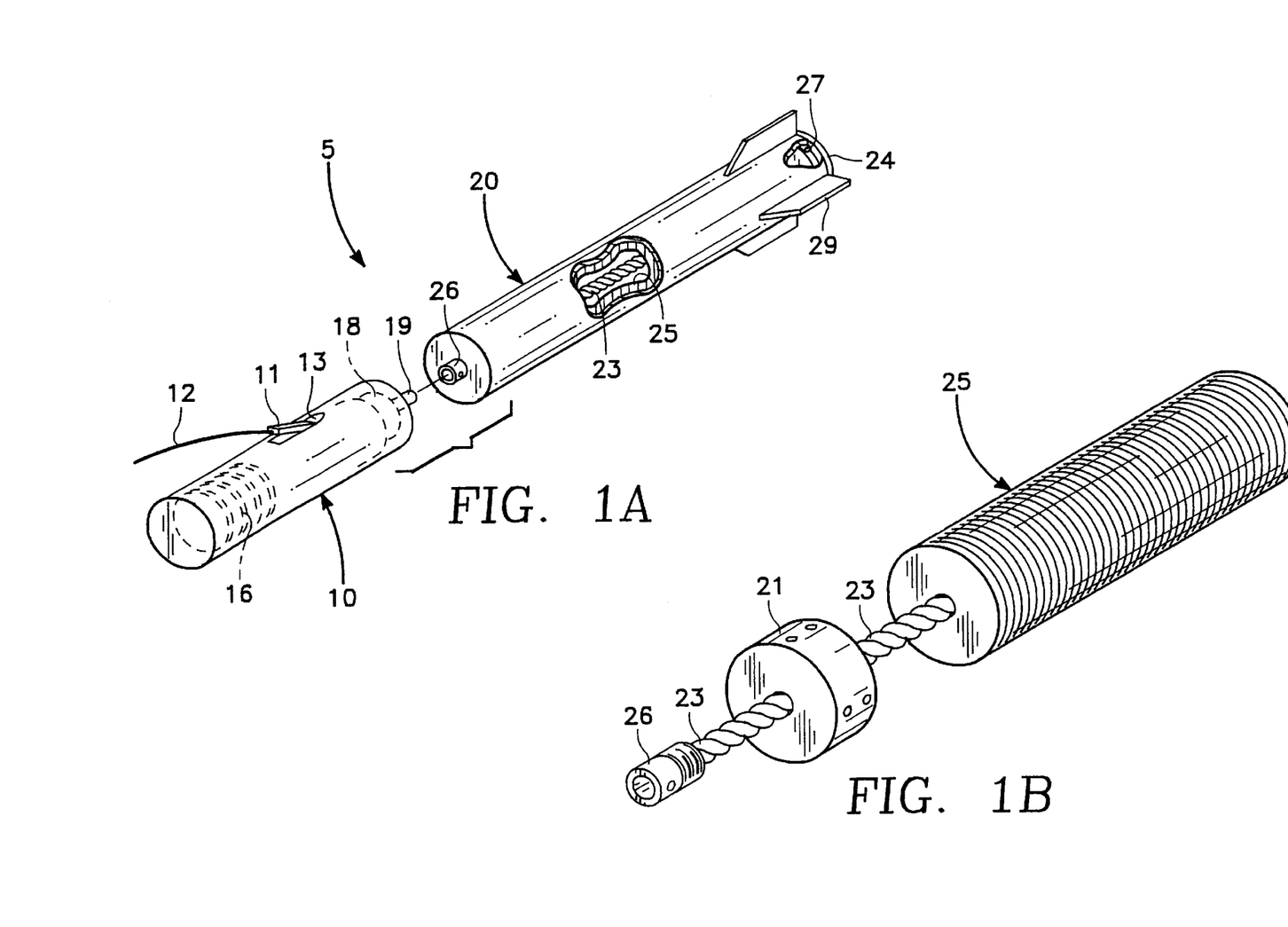
FIG. 1 is a drawing of the decoy constructed in accordance with this invention showing the two sections of the towbody.
Figure 2:
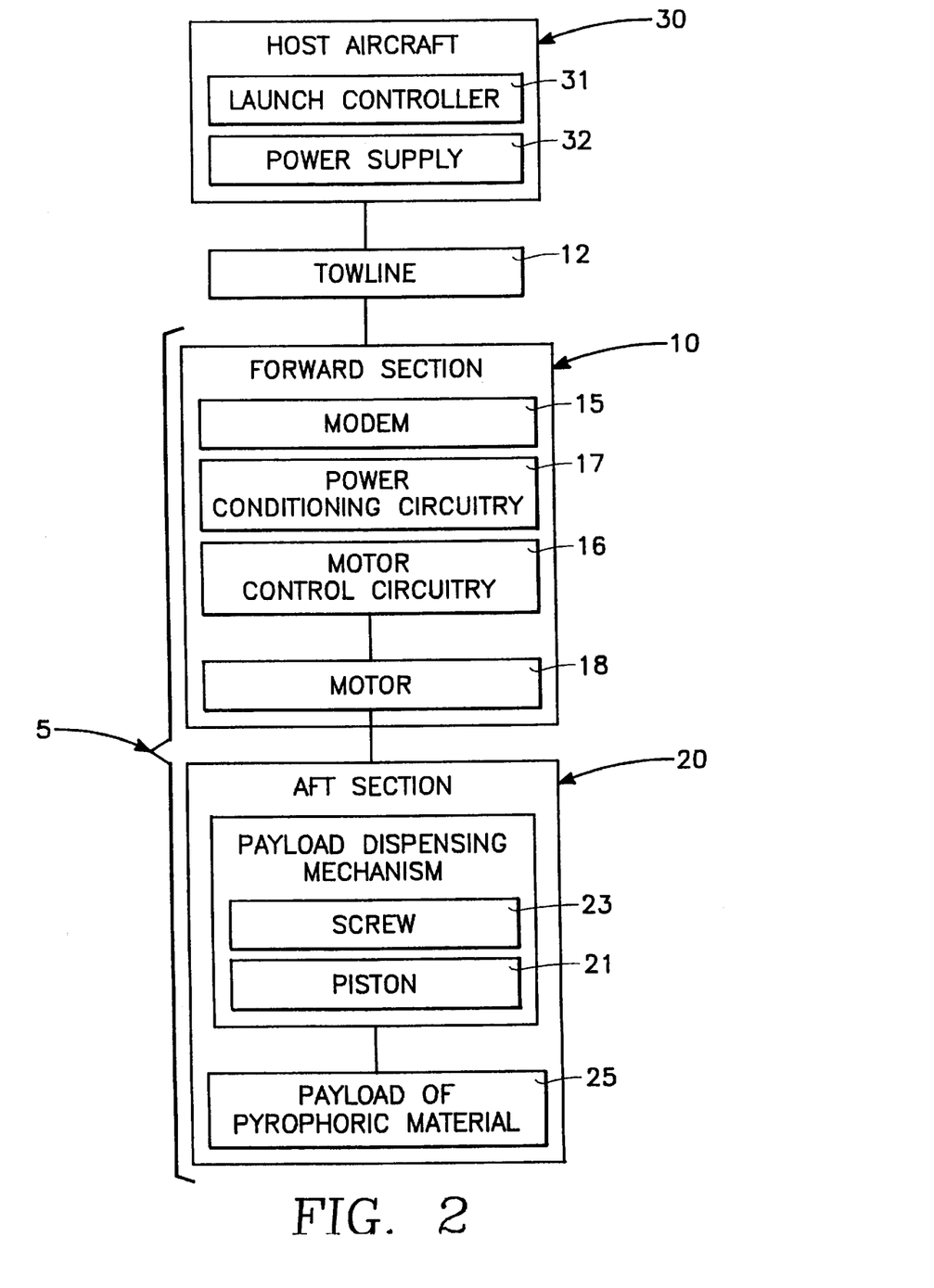
FIG. 2 is a block diagram of the major components embodying the present invention.

FIG. 1 provides an overall schematic of a decoy 5 which provides the kinematic, spectral, intensity and temporal features capable of defeating all types of current non-imaging IR missiles. FIG. 2 provides a block diagram of some of the more important components of the decoy 5. Referring to these FIGS. 1 and 2, the decoy 5 has two basic sections, the forward section 10 and the aft section 20. The sections can be made separately, and then joined and tested at a later date. Since the decoy 5 is manufactured in two separate sections, it has the advantage of allowing the aft section 20, which contains hazardous material and is subject to special handling and treatment requirements normally accorded fuels or munitions, to be manufactured and stored separately from the forward section 10. In the embodiment shown in FIG. 1 the decoy has a cylindrical housing and is approximately 16.7 inches in length and 2.4 inches in diameter. In general, the forward section contains electronics and a motor which act as a motive source for the payload dispensing mechanism. More specifically, the forward section 10 comprises a towline attachment 11 for attaching a towline 12, and an electrical interconnect 13. The electrical interconnect 13 brings power and communications from on-board a host aircraft 30 via appropriate electrical cabling disposed along the towline 12 to an on-decoy communications modem 15, motor controller 16 and power conditioning circuitry 17. The communications between the host aircraft 30 and the decoy are two-way. Commands involving dispense initiation start and stop and dispensing rates for the pyrophoric materials 25 in the aft section 20 are sent from the aircraft 30 to the decoy. The decoy 5 sends to the host aircraft 30 decoy health and status information. The motor controller 16 establishes the parameters for motor operation and operates the motor 18. The motor shaft 18a has a blindmate connector 19 that connects to a coupling 26 on the aft section 20 of the decoy. The motor 18 is preferably an electric stepper motor. Additionally, the forward section 10 includes a ballast (not shown) which assures aerodynamic stability by controlling the decoy's center of gravity and center of pressure. The ballast also provides structural rigidity and attachment points for securing the aft section.

In general, the aft section 20 contains a payload dispensing mechanism and a payload of pyrophoric materials in hermetically sealed packages. More particularly, the aft section 20 includes a non-rotating piston 21, a screw shaft 23, a "spin-off" end cap 24 and several thousand foils or packets of pyrophoric material 25. There are also four equally space, spring-erected, stabilizing fins 29 mounted at the aft section 20. These fins 29 spring into place when the decoy is deployed. The piston 21 is prevented from rotating on the screw 23 by an anti-rotation mechanism. This anti-rotation mechanism can be of any appropriate design. However, a wheel-stabilizer configuration is preferred. In this preferred configuration there is a longitudinally oriented slot on the inner surface of the aft section 20 into which extends a portion of a rotating wheel incorporated into the external surface of the piston. The wheel is fitted in a slot within the body of the piston and affixed such that a portion of the wheel extends beyond the surface of the piston and is capable of rotating within the slot. As the piston 21 is driven forward the wheel rotates as it moves through the slot, thereby preventing binding of the piston within the aft housing. However, contact between the sides of the wheel and the walls of the slot prevents the piston from rotating within the aft body.

The screw shaft 23 is preferably an acme screw and runs the length of the payload section terminating at the end cap 24. In this embodiment the foils 25 are doughnut shaped and are mounted on the screw 23. The foils are preferably 1.5 to 2.0 mils thick and preferably 6000 to 7000 disks/foils of pyrophoric material are used. Packets of pyrophoric powder can also be used, either alone or in conjunction with the foils 25.

Upon command, the electric motor 18 turns the acme screw 23 causing the end cap 24 to spin off and the piston 21 to ride down the screw 23 pushing the pyrophoric foils 25 ahead of it. Each foil and/or powder packet is hermetically sealed using a casing made from, for example, mylar or another plastic material. As the packets are pushed out of the back of the decoy, they are cut open by a sharp projection located at the back of the aft section. The pyrophoric materials 25 burn or glow when exposed to air and emit IR radiation. The packets of pyrophoric material are mounted on the screw 23 with a preload that compresses the packets together in the longitudinal direction within the aft section 20. The compressed packets act as a solid object when pushed aftward by the piston 21. As a result, the packets at the aft end of the section 20 begin dispensing immediately when the piston 21 is moved and are dispensed at a rate dictated solely by the speed of the piston. This ensures an accurate metering of the material. In addition, the preload causes each foil to "spring" out of the back of the payload section, thereby facilitating the dispensing of the material.

An O-ring 27, disposed at the back end of the aft section 20, extends into the interior of the section far enough to contact a peripheral portion of the face of each foil 25 as it reach the back end just prior to being dispensed. This O-ring 27 has a dual purpose. First, it acts as a seal preventing outside air from gaining access to the interior of the aft section 20 where it could react with the remaining pryrophoric foils 25. In addition, the O-ring 27 imposes a slight resistive force against each foil 25 as it is dispensed from the back end of the aft section 20. This resistance causes each foil to "spring" out of the back of the payload section, thereby facilitating dispensing of the material. While an O-ring is preferred, it should be noted that any similar structure which provides both the sealing and the resistance function could be employed instead. For example, a shoulder or flap might be employed with equal success.

A braking mechanism is contained in a towline reel on the aircraft which holds the towline 12. The braking mechanism allows the decoy to be towed in a discrete position relative to the host aircraft 30 unique to the type of aircraft and the location on the aircraft where the decoy deploying mechanism is housed. The distance the decoy is positioned behind the aircraft is be chosen to be close enough to allow the decoy to be in proximity to the host aircraft's exhaust plume such that both the aircraft's plume and decoy's flares are in the missile seeker's field of view at the onset of missile engagement. However, the distance should also be far enough that the decoy clears the aircraft's superstructure and can provide an effective distraction for an attacking IR missile. This braking mechanism and towline reel are essentially the same as used for the aforementioned radar decoy system and so no greater detail will be provided herein.

Power is delivered down the towline 12 to the decoy 5 from a power supply 32 contained on the on-aircraft launch controller 31. In a tested embodiment a 350V power source was used. The power provided by the source 32 is further conditioned by the power conditioning circuitry 17 in the decoy to provide three discrete voltages necessary to operate the decoy and electronic components.

The decoy embodying the present invention is electronically configurable such that it can be made to replicate a variety of aircraft engine infrared plume signatures. This allows the same decoy to be used on a number of tactical and combat support aircraft whose plume signatures appear within a range of approximately 300 to 3000 watts per steradian. This intensity range is accomplished via material dispensing commands transferred from a launch controller 31 onboard the host aircraft 30 down the towline 12 to the decoy and then through the on-decoy modem 15 to the motor control circuitry 16. The commands instruct the motor controller 16 to control payload dispensing at a rate sufficient to achieve decoy IR signature to aircraft IR signature matching. Specifically, the rate at which the motor 18 turns, which in turn dictates the translation speed of the piston and determines the rate at which the foils are dispensed into the atmosphere (and thus, the intensity of the IR signature). The more units of material dispensed per unit of time, the higher the IR intensity generated. It is noted that the dispensing rate required to mimic a particular aircraft's IR signature can be readily determined using currently known methods. Therefore, no detailed listing of the dispensing rates associated with particular aircraft will be provided herein.

Modeling and analysis of the current generation of non-imaging IR threat missiles, played against an array of aircraft-launched flare decoys deployed from U.S. military aircraft, has resulted in a more comprehensive understanding of the key elements required to be effective against these threat missiles. The key elements are directly related to the methodologies used by IR-guided missiles to discriminate between real (aircraft) targets and decoy (flare) targets. Specifically, current non-imaging IR-guided missile employ kinematic, spectral, radiant intensity, and temporal discriminants to avoid being deceived by the deployment of IR emitting flares. These discriminants will be described below, as well as how the preferred embodiments of the present invention overcome these discriminants.

1.0 Kinematic

In order to be effective the decoy flare must be kinematically equivalent to its host aircraft. Ideally, it should follow the movements of the aircraft it is protecting. It cannot be allowed to fall out of the field of view of the attacking missile else it loses its ability to divert the attacking missile. Towing the decoy is one way (and perhaps the best way) to accomplish this. A towed IR decoy's ability to appear kinematically equivalent to the host aircraft is particularly advantageous when the aircraft is diving. Military aircraft usually fly at a sanctuary altitude where they are too high to be reached by any missile threat. The planes then dive on a target, fire and pull back up to sanctuary altitude. IR flares fall away too quickly when the aircraft is in a high speed dive, providing little protection when compared to the towed IR decoy of the present invention.

2.0 Spectral

In order to be effective the decoy flare must exhibit approximately the same IR spectral characteristics as are exhibited by the aircraft's exhaust plume. This is necessary to preclude the attacking IR missile from discriminating between real (aircraft) and decoy (flare) targets by seeing or comparing the presence or absence of certain wavelengths within the IR spectrum. The optimal method of achieving this is to use the aforementioned pyrophoric flare materials which burn at approximately the same spectra as hydrocarbon based jet aircraft fuels.

3.0 Radiant Intensity

In order to be effective the decoy flares must be able to achieve radiant intensity levels exhibited by the engines on the various military aircraft it will be protecting. Obviously, since the engines of these fighter and combat support aircraft tend to produce widely varying levels of IR emissions, the IR decoy's flares must also be capable of duplicating this range of intensities.

Figure 3:
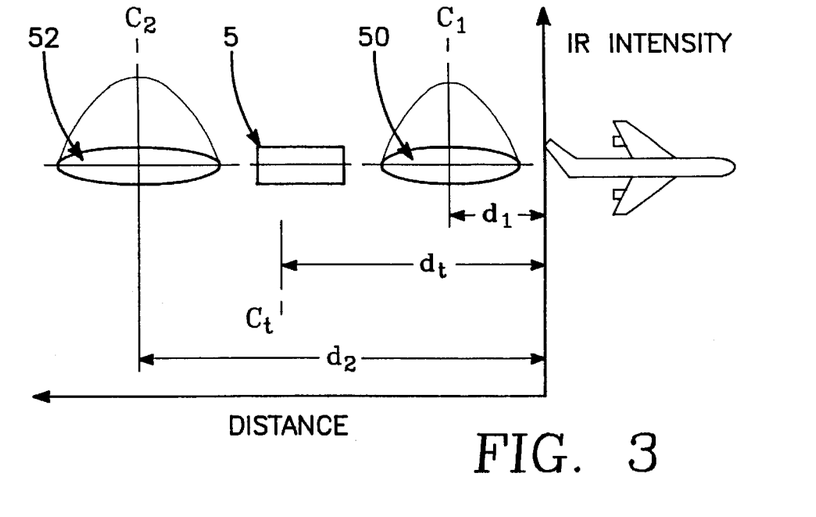
FIG. 3 shows the shifting of the IR centroid calculated by a missile seeker due to the presence of the towed decoy of the present invention.

Some IR-guided missiles calculate the location of the target aircraft by calculating the centroid of the IR emissions present in the missile seeker's field of view. These seekers then calculate the distance from the centroid to where the actual aircraft body would most likely be located. For example, as depicted in FIG. 3, the host aircraft's engine plume 50 would normally be perceived by the missile seeker as having an IR intensity centroid at $C_1$ and would calculate the distance $d_1$ that the centroid of the plume should be from the aircraft. However, with the addition of the towed decoy 5, and its IR intensity centroid $C_2$ at a distance $d_2$ in the missile seeker's field of view, the missile seeker will calculate the IR centroid $C_t$ between $C_1$ and $C_2$ at a distance $d_t$ behind the aircraft. As a result the missile seeker will miscalculate the position of the aircraft. Hence, the towed decoy of the present invention is placed at a distance close enough to be in the missile seeker's field of view, but also far enough behind the host aircraft to cause sufficient error in the missile seeker's infrared centroid calculation such that the missile misses its target aircraft. To counter such missiles, the IR radiation intensity pattern produced by the decoy need not vary and so the IR emitting pyrophoric packets can be dispensed at a steady rate. However, there are advantages to varying the intensity as will be discussed next.

Figure 4:
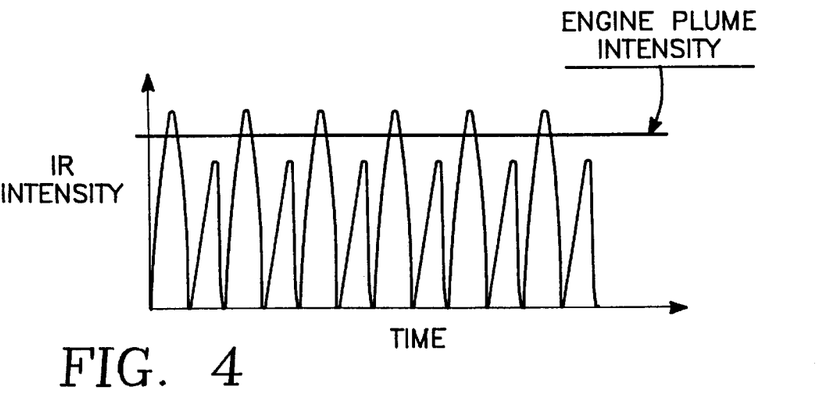
FIG. 4 shows an IR modulation pattern entailing high and low intensity spikes.

Varying the intensity of the IR radiation intensity emitted by the decoy can be used to deceive the seekers of some missile employing intensity discriminants other than just the centroid scheme described above. In one preferred IR radiation intensity modulation pattern depicted in FIG. 4, the radiant intensity is varied from somewhat higher to somewhat lower than the aircraft engine's IR signature. This is accomplished by varying the speed of the of the piston 21 on the screw 23 pushing the pyrophoric payload 25 out of the back of the decoy into the air stream. Some current generation IR missiles attempt to counter IR flare countermeasures by rejecting the brighter IR sources (or weaker in some cases), when more than one source is detected. This is done on the assumption that the presence of an additional source or sources indicates the presence of IR emitting flares. The above-described modulated IR radiation intensity pattern tends to deceive these intensity discriminating missiles by attracting the missile to the decoy or at least away from the aircraft. If the missile is the type that rejects the brighter of the IR sources, the repeated IR bursts having a radiant intensity below that of the aircraft's exhaust plume will cause the missile to be distracted from the aircraft and toward the decoy instead. However, if the missile is of the type that seeks the brighter IR source, the portion of the modulated IR radiation intensity pattern that exceeds the IR emissions of the aircraft's exhaust plume will attract the missile and spare the aircraft. Thus, the "high-low" intensity pattern will defeat the missile, regardless of the which CCM it employs.

The aforementioned IR radiation intensity pattern exhibiting a high IR energy spike compared to the aircraft's exhaust plume, followed by a low energy spike compared to the aircraft exhaust plume (as depicted in FIG. 3) will also deceive IR guided missile employing the centroid scheme as a IRCCM. Essentially, the pattern causes the missile's centroid calculations to be skewed aftward just as it would if the a steady intensity pattern were employed. This will result in the missile miscalculating the location of the target aircraft, causing the attacking missile to miss its mark.

Further, some missiles that employ the centroid scheme as a IRCCM add a feature by which the missile temporarily ceases tracking the target when a high intensity IR spike is detected on the assumption that it is an IR emitting flare. While temporarily out of its seeking mode, the missile steers toward the projected location for the aircraft based on it last known position. It is believed that when the missile resumes its IR tracking a few seconds later, the flare will have fallen out of the missile seekers field of view and only the aircraft will remain. The intensity spikes exceeding the IR emissions of the aircraft's engine plume associated with the decoy IR intensity modulation pattern will trigger the above-described missile's IR tracking shut-down mode. However, when the missile resumes tracking and reacquires what is assumed to be the aircraft alone, it will actually be the aircraft with its decoy. Either this scenario will cause the missile to miscalculate the position of the aircraft in relation to the IR radiation field or it will cause the missile to continuously shut-down its IR seeking function making it unlikely to actually hit the aircraft.

Figure 5:
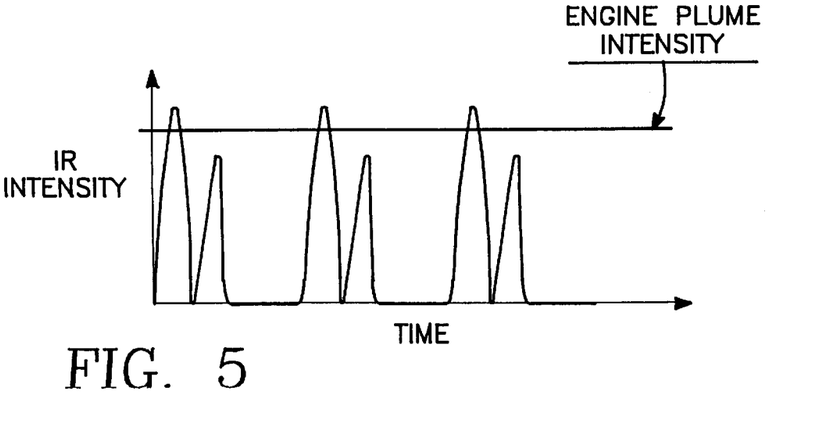
FIG. 5 shows another IR modulation pattern entailing a high and low intensity spikes followed by a waiting period.

To even further skew the IR centroid calculations of missile seekers which calculate the IR centroid in their seeker field of vision, the towed decoy can dispense pyrophoric material in a manner which results in a large IR radiation intensity spike (higher than that of the aircraft's exhaust plume), a low IR radiation intensity spike (lower than that of the plume), and then wait for a short period of time before repeating the cycle (high spike, low spike, waiting period) as shown in FIG. 5. This IR radiation intensity pattern will further skew the centroid that the missile seeker calculates because by waiting after the high spike, low spike combination a series of flare intensities which stretch out further in distance behind the aircraft than with the previously-described alternating high spike, low spike combination. Thus, this pattern would defeat all the IR radiation intensity-based CCMs described previously.

4.0 Temporal

In order to be effective, the decoy must be able to overcome temporal based IRCCMs employed by some IR-guided missiles. Essentially, these missiles have the capacity to distinguish between the relatively continuous IR emission levels associated with the aircraft's exhaust plume and the rapidly decreasing IR emissions associated with an IR emitting flare. The towed decoy of the present invention is able to defeat the temporal discriminants of an IR-guided missile because, once activated, the pyrophoric material packets can be continuously dispensed over a relatively long period of time (as compared to current aircraft-launched flare systems), thereby maintaining the desired IR emission levels. It is the decoy's ability to dispense the IR emitting flares one at a time at controlled rates that provides the relatively long life, i.e. on the order of tens of seconds. Further, if the decoy is damaged or destroyed or simply uses up all its pyrophoric material, it can be automatically and almost instantaneously replaced. For example, if communication is interrupted between the aircraft and the decoy, this event can, at operator option, be used as an automatic cue to deploy another decoy. This provides a nearly continuous protection from IR missiles and allows the towed decoy to be used preemptively by deploying it whenever the aircraft is susceptible to attack from an IR-guided missile. The IR emitting flares are dispensed from the decoy, and the decoys are continuously replaced as long as the aircraft remains in the threat area. The long life of the decoy is also enhanced by a capability to cease dispensing of the flare material if the aircraft successfully evades missile engagement, thereby reserving flare material for potential future missile threats. Finally, when employed, the aforementioned "high-low-pause" IR emission pattern will allow the towed decoy to conserve flare material so as to remain viable for a longer period of time.

In summary, the foregoing description has shown the unique towed IR decoy according to the present invention overcomes the key kinematic, spectral, intensity and temporal IRCCMs employed by the current generation of non-imaging IR-guided missiles and significantly increases aircraft survivability against these threats.

While the invention has been described in detail by specific reference to preferred embodiments thereof, it is understood that variations and modifications thereof may be made without departing from the true spirit and scope of the invention. For example, different payloads might be used to simulate aircraft IR signatures. Pyrophoric foils of different thicknesses and in different numbers may be used. For instance, the foils can be packaged individually or in groups of foils. This packaging method provides an alternate way of varying the IR intensity of the material that is deployed from the decoy by having greater or lesser numbers of foils packed in one package. Pyrophoric powders can also be used either alone or in conjunction with the foils. The decoy of the present invention could also be different sizes or shapes. For instance, the towed IR decoy could be made with a non-circular cross-section such as a square shape. This square-shaped cross section, or any shape that is not circular, would obviate the need for the wheel-stabilizer or other non-rotation mechanism that is employed in the decoy having a circular cross-section. The towbody of the decoy could also be made of more than two sections, or alternately could take the form of a single integrated structure.

Wherefore, having thus described the present invention, what is claimed is:

1. An apparatus for defeating infrared (IR)-guided missile attacks on an aircraft comprising:
 a decoy towed behind the aircraft, said decoy being capable of receiving commands transmitted from said aircraft; and
 means, disposed within said decoy, for dispensing IR emitting flares, wherein the rate at which said flares are dispensed is determined by said commands.

2. The apparatus of claim 1 wherein the decoy is towed at a distance behind the aircraft that places it close enough to the aircraft's exhaust plume that both the IR emissions from the aircraft's exhaust plume and the IR emissions of at least some of the flares dispensed from the towed decoy are in the field of view of a seeker of an IR guided missile, but far enough behind the aircraft's exhaust plume that the seeker of the missile miscalculates the location of the aircraft.

3. The apparatus of claim 1, for use to defeat an IR guided missile employing kinematic counter—counter measures (CCMs) designed to discriminate between an aircraft moving through the air and an IR emitting flare falling away from the aircraft once deployed therefrom, wherein said dispensing means continuously dispenses flares at a distance behind the aircraft that ensures both the IR emissions from the aircraft's exhaust plume and the IR emissions of at least some of the flares dispensed from said decoy are in the field of view of a seeker of the IR guided missile, thereby preventing the missile from distinguishing between the aircraft's exhaust plume and the flares, thereby defeating said kinematic CCMs.

4. The apparatus of claim 1, for use to defeat an IR guided missile employing spectral CCMs designed to discriminate between the IR spectra of an aircraft's exhaust plume and the IR spectra of an IR emitting flare, wherein said dispensing means dispenses IR emitting flares comprising pyrophoric flare materials which emit, when exposed to air, an IR spectra similar to that emitted by the aircraft's exhaust plume, thereby defeating said spectral CCMs.

5. The apparatus of claim 1, for use to defeat an IR guided missile employing IR radiation intensity CCMs designed to discriminate between the radiant intensity of the IR emissions from the aircraft's exhaust plume and the radiant intensity of the IR emissions from an IR emitting flare, wherein said dispensing means dispenses the IR emitting flares at rates which create IR energy levels behind the decoy which cannot be effectively distinguished from that of the aircraft's exhaust plume, thereby defeating said intensity CCMs.

6. The apparatus of claim 5, wherein the IR emitting flares are dispensed at a steady rate which creates IR energy levels behind the decoy that substantially match the IR energy levels associated with the aircraft's exhaust plume.

7. The apparatus of claim 5, wherein the IR emitting flares are dispensed at rates which produce a varying IR radiation intensity pattern behind the decoy, said pattern comprising a repeating sequence of at least two IR radiation intensity spikes wherein one of the at least two spikes peaks at an IR radiation intensity above that of the aircraft's exhaust plume and another of the at least two spikes peaks at an IR radiation intensity below that of the aircraft's exhaust plume.

8. The apparatus of claim 5, wherein the IR emitting flares are dispensed at rates which produce a varying IR radiation intensity pattern behind the decoy, said pattern comprising a repeating sequence of at least two IR radiation intensity spikes followed by a period of time in which no flares are dispensed, wherein one of the at least two spikes peaks at an IR radiation intensity above that of the aircraft's exhaust plume and another of the at least two spikes peaks at an IR radiation intensity below that of the aircraft's exhaust plume.

9. The apparatus of claim 1, for use to defeat an IR-guided missile employing temporal CCMs designed to distinguish between continuous IR emissions associated with the aircraft's exhaust plume and rapidly decreasing IR emissions associated with aircraft-launch IR emitting flares as sensed by the IR-guided missile, wherein said dispensing means dispenses IR emitting flares from the decoy at rates that prevent the average IR emissions associated with the decoy's flares from decreasing in intensity over time, thereby defeating said temporal CCMs.

10. The apparatus of claim 1 wherein the towed IR decoy has a forward and an aft section, said forward section comprising:
    a housing;
    a towline attachment connected to the housing for attaching a towline from the aircraft;
    a motor disposed within the housing;
    a motor controller disposed within the housing and connected to the motor, said controller being capable of controlling the motor's speed;
    a communications modem disposed within said housing and connected to the motor controller, said modem capable of receiving said commands communicated from the aircraft and passing said commands on to the motor controller; and
    an electrical interconnect connected to the communications modem, said interconnect being mateable to an electrical cable capable of transmitting communications from the aircraft, said electrical cable following the towline from the aircraft to the decoy.

11. The apparatus of claim 10 wherein the commands communicated from the aircraft comprise motor control instructions dictating the speeds at which the motor is to be operated over time.

12. The apparatus of claim 10, wherein the communications modem is further capable of transmitting communications from the decoy to the aircraft, wherein said communications comprise information concerning the status of the decoy.

13. The apparatus of claim 12, wherein the absence of transmitted status information from the decoy for a prescribed period of time is interpreted as a failure of the decoy prompting its replacement.

14. The apparatus of claim 10, wherein the aft sections comprises:
    a housing having a forward and aft end;
    a payload disposed within the housing comprising pyrophoric materials;
    a payload dispensing mechanism capable of dispensing the pyrophoric materials from the aft end of the housing at prescribed rates.

15. The apparatus of claim 14 wherein said pyrophoric material comprises hermetically sealed packets and wherein the aft section further comprises a cutting device disposed at the aft end of the housing, said cutting device being capable of cutting open each packet of pryrophoric material as it is dispensed from the aft end of the housing, thereby exposing the pyrophoric material to the atmosphere and causing it to emit IR radiation.

16. The apparatus of claim 15 wherein each packet of pyrophoric material is 1.5 to 2.0 mils thick and at least about 6000 packets are disposed within the aft section housing.

17. The apparatus of claim 15 wherein each packet comprises at least one of (i) a foil covered with powderized pyrophoric material and (ii) powderized pyrophoric material.

18. The apparatus of claim 15, wherein each packet comprises at least one foil covered with powderized pyrophoric material, and wherein the number of foils contained in each packet once cut open and exposed to the atmosphere determines the intensity of the IR radiation emitted form that packet, and wherein the number of foils contained in each package and the order in which the packets are placed into the aft section is selected to provide a desired IR emission pattern behind the decoy.

19. The apparatus of claim 14, wherein the payload dispensing mechanism comprises:
    a threaded screw shaft longitudinally mounted within said housing, said screw shaft being capable of rotating about its longitudinal axis;
    an endcap enclosing the aft end of the housing, said endcap being in correspondence with an aft end of the screw shaft such that whenever the screw shaft is rotated in a first direction, the end cap detaches from the aft end of the housing and falls away;
    a piston disposed within the aft section housing, wherein said piston comprises a treaded central channel threadably mated to the screw shaft and an anti-rotation mechanism capable of preventing the piston from rotating in relation to the aft housing, and wherein said piston moves aftward within the housing whenever the screw shaft is rotated in said first direction; and wherein packets of pyrophoric material are mounted on the screw shaft aft of the piston such that whenever the screw shaft is rotated in said first direction, the piston pushes the packets aftward causing the packets to be dispensed one by one from the aft end of the housing.

20. The apparatus of claim 19, wherein the packets of pyrophoric material are compressed together in the longitudinal direction of the housing so as to prevent any additional compression whenever the screw shaft is rotated in said first direction and to maximize the number of packets disposed within the housing.

21. The apparatus of claim 19 wherein the forward section's motor has an output connector which is releasably mateable with a forward end of the screw shaft of the aft section, such that whenever the motor is operated it rotates the screw shaft in said first direction.

22. The apparatus of claim 21, wherein the speed at which the motor is operated by the motor controller dictates a speed of rotation of the screw shaft, thereby controlling the speed at which the piston moves aftward and so the rate at which the packets of pyrophoric material are dispensed from the towed decoy, said rate of dispensing dictating the IR emission levels behind the decoy.

23. The apparatus of claim 22, wherein the motor controller is instructed via communications comprising motor speed instructions to vary the speed of the motor over time, thereby modulating the IR emissions levels behind the decoy.

24. A method for defeating infrared (IR) guided missile attacks on an aircraft comprising the steps of:

towing an IR flare-dispensing decoy behind the aircraft; and dispensing the IR flares behind the towed decoy to cause an IR guided missile targeting the aircraft to miss the aircraft, wherein the rate at which said IR emitting flares are dispensed is controlled by commands communicated from said aircraft to said decoy.

25. The method of claim 24 wherein the towing step comprises towing the decoy at a distance behind the aircraft that places it close enough to the aircraft's exhaust plume that both the IR emissions from the aircraft's exhaust plume and the IR emissions of at least some of the flares dispensed from the towed decoy are in the field of view of a seeker of an IR-guided missile, but far enough behind the aircraft's exhaust plume that the seeker of the missile miscalculates the location of the aircraft.

26. The method of claim 24, wherein the IR guided missile employs kinematic counter-countermeasures (CCMs) designed to discriminate between an aircraft moving through the air and a IR emitting flare falling away from the aircraft once deployed therefrom, and wherein the towed decoy defeats the kinematic CCMs by continuously dispensing IR emitting flares at a distance behind the aircraft that ensures both the IR emissions from the aircraft's exhaust plume and the IR emissions of at least some of the flares dispensed from the towed decoy are in the field of view of a seeker of the IR guided missile, thereby preventing the missile from distinguishing between the aircraft's exhaust plume and the flares.

27. The method of claim 24, wherein the IR guided missile employs spectral CCMs designed to discriminate between the IR spectra of an aircraft's exhaust plume and the IR spectra of an IR emitting flare, and wherein the spectral CCMs are defeated by the step of employing IR emitting flares comprising pyrophoric flare materials which emit, when exposed to air, an IR spectra similar to that emitted by the aircraft's exhaust plume.

28. The method of claim 24, wherein the IR guided missile employs IR radiation intensity CCMs designed to discriminate between the radiant intensity of the IR emissions from the aircraft's exhaust plume and the radiant intensity of the IR emissions from an IR emitting flare, and wherein IR radiation intensity CCMs are defeated by the step of causing the decoy to dispense the IR emitting flares at rates which create IR energy levels behind the decoy which cannot be effectively distinguished from that of the aircraft's exhaust plume.

29. The method of claim 28, wherein the dispensing step comprises dispensing the IR emitting flares at a steady rate to create IR energy levels behind the decoy that substantially match the IR energy levels associated with the aircraft's exhaust plume.

30. The method of claim 28, wherein the dispensing step comprises dispensing the IR emitting flares at rates which produce a varying IR radiation intensity pattern behind the decoy, said pattern comprising a repeating sequence of at least two IR radiation intensity spikes wherein one of the at least two spikes peaks at an IR radiation intensity above that of the aircraft's exhaust plume and another of the at least two spikes peaks at an IR radiation intensity below that of the aircraft's exhaust plume.

31. The method of claim 28, wherein the dispensing step comprises dispensing the IR emitting flares at rates which produce a varying IR radiation intensity pattern behind the decoy, said pattern comprising a repeating sequence of at least two IR radiation intensity spikes followed by a period of time in which no flares are dispensed, wherein one of the at least two spikes peaks at an IR radiation intensity above that of the aircraft's exhaust plume and another of the at least two spikes peaks at an IR radiation intensity below that of the aircraft's exhaust plume.

32. The method of claim 24, wherein the IR guided missile employs temporal CCMs designed to distinguish between continuous IR emissions associated with the aircraft's exhaust plume and rapidly decreasing IR emissions associated with aircraft-launched IR emitting flares as sensed by the IR guided missile, and wherein the temporal CCMs are defeated by a step of dispensing IR emitting flares from the decoy at rates that prevent the average IR emissions associated with the decoy's flares from decreasing in intensity over time, and dispensing the flares from the decoy for a longer period of time relative to the dispensing of aircraft-launched flares.

33. The apparatus of claim 15, wherein the aft section further comprises a sealing structure disposed at its aft end which seals the interior of the aft section from intrusion by outside air, while still allowing the pyrophoric foils to be dispensed from the aft end of the section.

34. The apparatus of claim 33, wherein the sealing structure comprises an O-ring which projects into the interior of the aft section's housing to an extent that causes it to contact a periphery of a rearward directed face of each pyrophoric foil whenever the foil is in the aftmost position in the payload.

* * * * *